United States Patent
Balenda, II et al.

(10) Patent No.: US 10,113,627 B2
(45) Date of Patent: Oct. 30, 2018

(54) DIFFERENTIAL ASSEMBLY WITH MULTI-PIECE CROSS-PIN

(71) Applicant: American Axle & Manufacturing, Inc., Detroit, MI (US)

(72) Inventors: Joseph S. Balenda, II, Grand Blanc, MI (US); Thomas E. Gansenhuber, Lapeer, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 121 days.

(21) Appl. No.: 15/422,909

(22) Filed: Feb. 2, 2017

(65) Prior Publication Data
US 2018/0216714 A1   Aug. 2, 2018

(51) Int. Cl.
*F16H 48/08* (2006.01)

(52) U.S. Cl.
CPC ....... *F16H 48/08* (2013.01); *F16H 2048/085* (2013.01)

(58) Field of Classification Search
CPC ................................................ F16H 2048/085
See application file for complete search history.

(56) References Cited

U.S. PATENT DOCUMENTS

| | | | |
|---|---|---|---|
| 1,544,805 A | | 7/1925 | Celander |
| 3,276,290 A | * | 10/1966 | Randall ................... F16H 48/08 475/233 |
| 3,593,595 A | | 7/1971 | Taylor |
| 3,964,346 A | * | 6/1976 | Myers, Sr. .............. F16H 48/08 475/234 |
| 4,860,614 A | * | 8/1989 | Erdmann ................ F16H 48/08 475/246 |
| 5,186,694 A | * | 2/1993 | Cooper .................. F16H 48/08 475/220 |

(Continued)

FOREIGN PATENT DOCUMENTS

| | | | | |
|---|---|---|---|---|
| DE | 19919515 A1 | * | 11/2000 | ............. F16H 48/08 |
| EP | 1079148 A1 | * | 2/2001 | ............. F16H 48/08 |
| JP | 2011185402 A | * | 9/2011 | ............. F16H 48/36 |

OTHER PUBLICATIONS

*Mechanical Movements—Powers & Devices, 11th Edition*, Gardner D. Hiscox M.E., 940. Multiple Gear Speed, p. 239, The Norman W. Henley Publishing Co. (1907).

*Primary Examiner* — Jacob S. Scott
*Assistant Examiner* — Timothy Hannon
(74) *Attorney, Agent, or Firm* — Harness, Dickey & Pierce, P.L.C.

(57) ABSTRACT

A differential assembly can include a case, a first side gear, a second side gear, a first pinion gear, a second pinion gear, a third pinion gear, and a cross-pin assembly. The case can be adapted to be supported for rotation about an output axis. The first and second side gears can be disposed within the case and rotatable about the output axis relative to the case. The first, second, and third pinion gears can be disposed within the case and meshingly engaged with the first and second side gears. The cross-pin assembly can include a spider, first, second, and third pins. The proximal end of the first pin can define a first bore that can receive a post of the spider to couple the first pin to the spider. Each pinion gear can be supported by one of the pins for rotation relative to the case.

18 Claims, 6 Drawing Sheets

(56) References Cited

U.S. PATENT DOCUMENTS

| | | |
|---|---|---|
| 6,743,138 B2 | 6/2004 | Krzesicki et al. |
| 7,081,065 B2 | 7/2006 | Sudou |
| 8,167,758 B2 * | 5/2012 | Downs ................ F16H 57/0483 184/11.1 |
| 2004/0048713 A1 * | 3/2004 | Krude .................... F16H 48/10 475/222 |
| 2004/0157696 A1 * | 8/2004 | Saito ....................... F16H 48/08 475/230 |
| 2010/0093483 A1 * | 4/2010 | Krude .................... F16H 48/08 475/244 |
| 2010/0184552 A1 * | 7/2010 | Soybel ................... F16H 48/08 475/230 |
| 2014/0213407 A1 | 7/2014 | Fisher |
| 2015/0204431 A1 * | 7/2015 | Cochren ................ F16H 48/34 475/150 |

* cited by examiner

DIFFERENTIAL ASSEMBLY WITH MULTI-PIECE CROSS-PIN

FIELD

The present disclosure relates to a differential assembly having a multi-piece cross-pin.

BACKGROUND

This section provides background information related to the present disclosure which is not necessarily prior art.

One type of automotive differential employs a differential housing, a pair of bevel side gears and a plurality of bevel pinions. Some applications employ a single pair of bevel pinions that are meshingly engaged with the bevel side gears and supported for rotation in the differential housing about an axis via a single pinion shaft. Other applications employ three, equally spaced pinions that are supported for rotation in the differential housing about intersecting axes that form a "Y" shape (i.e., each axis forms a 60° angle between each other axis), and are meshingly engaged with the bevel side gears. Other applications employ two pairs of bevel pinions that are supported for rotation relative to the differential housing about two intersecting axes that form a cross shape (i.e., the axes are perpendicular to each other), and are meshingly engaged with the bevel side gears.

While such configurations work well for their intended purposes, the coupling of the pinion shafts relative to the differential housing can be complex and/or costly. Accordingly, there remains a need in the art for an improved differential having multiple pinion shafts that can be robustly secured relative to the differential housing in an efficient and cost-effective manner.

SUMMARY

This section provides a general summary of the disclosure, and is not a comprehensive disclosure of its full scope or all of its features.

In one form, the present teachings provide for a differential assembly which can include a case, a first side gear, a second side gear, a first pinion gear, a second pinion gear, a third pinion gear, and a cross-pin assembly. The case can be adapted to be supported for rotation about an output axis. The case can define a cavity. The first and second side gears can be disposed within the cavity and rotatable about the output axis relative to the case. The first, second, and third pinion gears can be disposed within the cavity and meshingly engaged with the first and second side gears. The cross-pin assembly can be disposed within the cavity and coupled to the case for common rotation about the output axis with the case. The cross-pin assembly can include a center spider, a first pin, a second pin, and a third pin. The first pin can be disposed about a first axis and coupled to the center spider for axial translation relative to the center spider. The first pinion gear can be supported by the first pin for rotation relative to the case about the first axis. The second pin can be disposed about a second axis and can be coupled to the center spider for axial translation relative to the center spider. The second pinion gear can be supported by the second pin for rotation relative to the case about the second axis. The third pin can be disposed about a third axis and coupled to the center spider for axial translation relative to the center spider. The third pinion gear can be supported by the third pin for rotation relative to the case about the third axis.

According to a further embodiment of the invention, the center spider can include a first post, a second post, and a third post. The first pin can define a first bore. The second pin can define a second bore. The third pin can define a third bore. The first post can be slidably received within the first bore. The second post can be slidably received within the second bore. The third post can be slidably received within the third bore.

According to a further embodiment of the invention, each of the first, second, and third posts can include a proximal portion and a distal portion. Each proximal portion can have an outermost radial width that is greater than an outermost radial width of the distal portion to define a step. Each step can contact a corresponding one of the first, second, or third pins to prevent axial translation of the corresponding first, second, or third pin toward a center of the center spider.

According to a further embodiment of the invention, the steps can space the first, second, and third pins axially apart to prevent contact between the first, second, and third pins.

According to a further embodiment of the invention, the differential assembly can further include a fourth pinion gear disposed within the cavity and meshingly engaged with the first and second side gears. The cross-pin assembly can further include a fourth pin disposed about a fourth axis and coupled to the center spider for axial translation relative to the center spider. The fourth pinion gear can be supported by the fourth pin for rotation relative to the case about the fourth axis. The first and second axes can be coaxial and the third and fourth axes can be coaxial.

According to a further embodiment of the invention, a proximal end of the first pin can include a first chamfered surface and a proximal end of the second pin can include a second chamfered surface. The first chamfered surface can contact the second chamfered surface to inhibit rotation of the first pin relative to the second pin.

According to a further embodiment of the invention, the first chamfered surface can be a flat surface disposed at a 45° angle relative to the proximal end of the first pin, and the second chamfered surface can be a flat surface disposed at a 45° angle relative to the proximal end of the second pin.

According to a further embodiment of the invention, the first chamfered surface can be a flat surface disposed at a 30° angle relative to the proximal end of the first pin, and the second chamfered surface can be a flat surface disposed at a 30° angle relative to the proximal end of the second pin.

According to a further embodiment of the invention, the first pin can include a tang that extends axially from a proximal end of the first pin. The second pin can include a groove that is recessed axially from a proximal end of the second pin. The tang can be received in the groove to inhibit rotation of the first pin relative to the second pin.

According to a further embodiment of the invention, each of the first, second, and third pins can include an outermost cylindrical surface and a lubrication channel recessed from the outermost cylindrical surface.

In another form, the present teachings further provide for a differential assembly can include a case, a first side gear, a second side gear, a first pinion gear, a second pinion gear, a third pinion gear, and a cross-pin assembly. The case can be adapted to be supported for rotation about an output axis. The case can define a cavity. The first and second side gears can be disposed within the cavity and rotatable about the output axis relative to the case. The first, second, and third pinion gears can be disposed within the cavity and meshingly engaged with the first and second side gears. The cross-pin assembly can be disposed within the cavity and coupled to the case for common rotation about the output axis with the case. The cross-pin assembly can include a center spider, a first pin, a second pin, and a third pin. The center spider can include a first post. The first pin can be disposed about a first axis. The first pin can have a proximal end and a distal end and can extend longitudinally therebetween. The proximal end of the first pin can define a first bore. The first post can be received in the first bore to couple the first pin to the center spider. The first pinion gear can be supported by the first pin for rotation relative to the case about the first axis. The second pin can be disposed about a second axis. The second pin can have a proximal end and a distal end and can extend longitudinally therebetween. The proximal end of the second pin can be coupled to the center spider. The second pinion gear can be supported by the second pin for rotation relative to the case about the second axis. The third pin can be disposed about a third axis. The third pin can have a proximal end and a distal end and can extend longitudinally therebetween. The proximal end of the third pin can be coupled to the center spider. The third pinion gear can be supported by the third pin for rotation relative to the case about the third axis.

According to a further embodiment of the invention, the center spider can include a second post. The proximal end of the second pin can define a second bore. The second post can be received in the second bore to couple the second pin to the second spider.

According to a further embodiment of the invention, the first and second axes can be coaxial.

According to a further embodiment of the invention, the second axis can be transverse to the first axis.

According to a further embodiment of the invention, the proximal end of the first pin can include a first chamfered surface and the proximal end of the second pin can include a second chamfered surface. The first chamfered surface can contact the second chamfered surface to inhibit rotation of the first pin relative to the second pin.

According to a further embodiment of the invention, each of the first, second, and third pins can include an outermost cylindrical surface and a lubrication channel recessed from the outermost cylindrical surface.

According to a further embodiment of the invention, each of the lubrication channels can include a flat surface that can be parallel to the first, second, and third axes.

According to a further embodiment of the invention, the first pin can include a tang that extends axially from the proximal end of the first pin, and the second pin can include a groove that is recessed axially from the proximal end of the second pin. The tang can be received in the groove to inhibit rotation of the first pin relative to the second pin.

According to a further embodiment of the invention, each of the first, second, and third pins can include an outermost cylindrical surface and a lubrication channel recessed from the outermost cylindrical surface.

According to a further embodiment of the invention, each of the lubrication channels can include a flat surface that can be parallel to the first, second, and third axes.

Further areas of applicability will become apparent from the description and claims herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
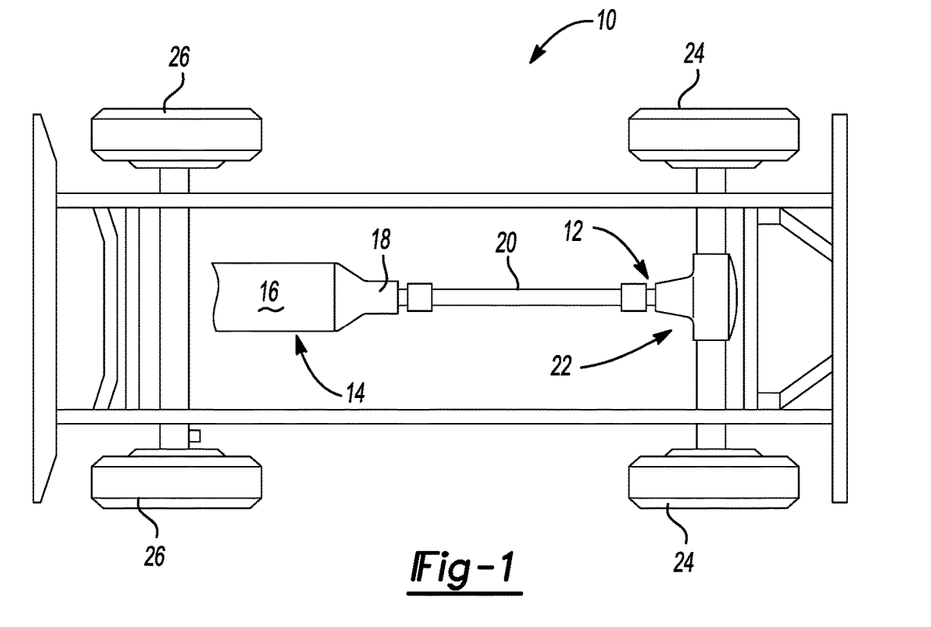
FIG. 1 is a schematic illustration of a motor vehicle equipped with an axle assembly constructed in accordance with the present teachings.

With reference to FIG. 1 of the drawings, a vehicle having an axle assembly that is constructed in accordance with the teachings of the present disclosure is generally indicated by reference numeral 10. The vehicle 10 can include a driveline 12 that can be drivable via a connection to a power train 14. The power train 14 can include an engine 16 and a transmission 18. The driveline 12 can include a propshaft 20, an axle assembly 22, and a plurality of wheels 24 and 26. In the example provided, the axle assembly 22 is a rear axle assembly configured to drive a set of rear wheels 24, though other configurations can be used. The engine 16 can be mounted in an in-line or longitudinal orientation along the axis of the vehicle 10, though other configurations can be used. The output of the engine 16 can be selectively coupled via a conventional clutch to the input of the transmission 18 to transmit rotary power (i.e., drive torque) therebetween. In the example provided, the input of the transmission 18 can be commonly aligned with the output of the engine 16 for rotation about a rotary axis. The transmission 18 can also include an output and a gear box having a plurality of drive ratios, such as in a manual transmission, or an automatic transmission. Alternatively, the transmission 18 can be a continuously variable transmission. The gear box can be operable for coupling the transmission input to the transmission output at a predetermined gear speed ratio. The propshaft 20 can be coupled for rotation with the output of the transmission 18. Drive torque can be transmitted through the prophaft 20 to the rear axle assembly 22 where it can be apportioned to the left and the right wheels 24.

Figure 2:
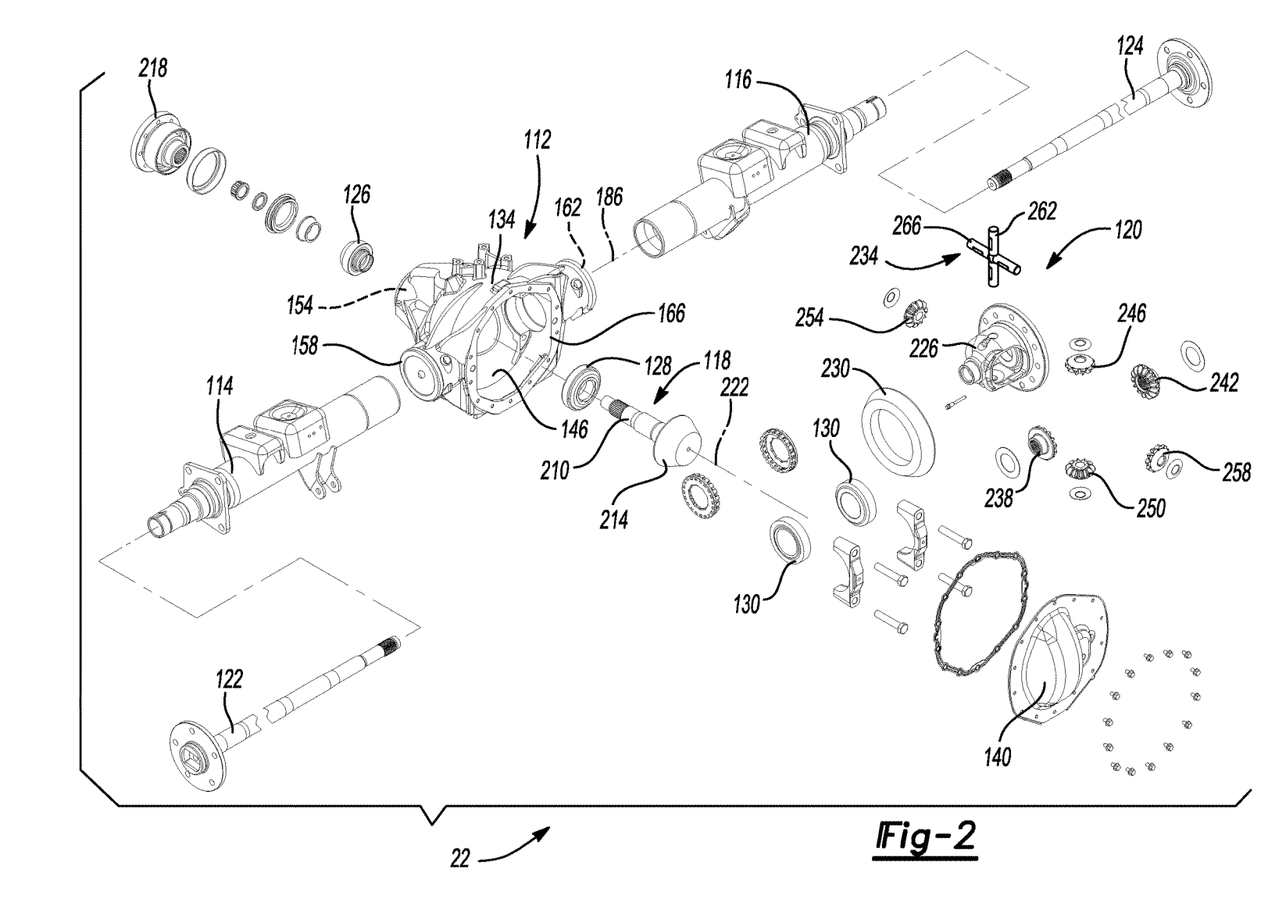
FIG. 2 is an exploded perspective view of the axle assembly of FIG. 1, illustrating a differential of the axle assembly.

With additional reference to FIG. 2, the example axle assembly 22 is illustrated in greater detail. The axle assembly 22 can include a housing assembly 112, a first axle tube 114, a second axle tube 116, an input pinion 118, a differential assembly 120, a first output member 122, a second output member 124, a tail bearing 126, a head bearing 128, and a pair of differential bearings 130. While the differential assembly 120 is described herein with reference to a rear axle assembly, the differential assembly 120 of the present teachings can be used in other configurations, such as in a transaxle (not shown) or other front-wheel drive or all-wheel drive drivelines (not shown) for example.

In the example provided, the housing assembly 112 can include a main body 134 and a cover body 140. The main body 134 can define an inner cavity 146. In the example provided, a front side of the main body 134 can include an input aperture 154, a left side of the main body 134 can include a first output aperture 158, a right side of the main body 134 can include a second output aperture 162, and a rear side of the main body 134 can include a main aperture or differential aperture 166. The input aperture 154, the first output aperture 158, the second output aperture 162, and the differential aperture 166 can be open through the main body 134 between the inner cavity 146 and an exterior of the main body 134.

The cover 140 can span across the differential aperture 166 to cover the differential aperture 166. The cover body 140 can be mounted to the main body 134, such as by fasteners for example, to encase the differential assembly 120 within the inner cavity 146.

The first axle tube 114 can be fixedly attached to the main body 134 at the first output aperture 158 and can be coaxial with the first output aperture 158. The first output member 122 can be disposed within the first axle tube 114 and supported therein for rotation about an output axis 186. An inboard end of the first output member 122 can extend into the inner cavity 146. An outboard end of the first output member 122 can extend outward of an outboard end of the first axle tube 114 and can be drivingly coupled to a corresponding one of the wheels 24 (FIG. 1).

The second axle tube 116 can be fixedly attached to the main body 134 at the second output aperture 162 and can be coaxial with the second output aperture 162. The second output member 124 can be disposed within the second axle tube 116 and supported therein for rotation about the output axis 186. An inboard end of the second output member 124 can extend into the inner cavity 146. An outboard end of the second output member 124 can extend outward of an outboard end of the second axle tube 116 and can be drivingly coupled to a corresponding one of the wheels 24 (FIG. 1).

The input pinion 118 can include a pinion shaft 210, a pinion gear 214, and an input flange 218. The pinion shaft 210 can extend through the input aperture 154. The input flange 218 can be fixedly mounted to one end of the pinion shaft 210 and disposed external of the main body 134. The input flange 218 can be coupled to the propshaft 20 (FIG. 1) for common rotation therewith. The pinion gear 214 can be fixedly coupled to the other end of the pinion shaft 210 and disposed within the inner cavity 146. The pinion shaft 210 can be supported for rotation about an input axis 222 by the tail bearing 126 proximate to the input flange 218, and the head bearing 128 proximate to the pinion gear 214. The input axis 222 can be transverse to the output axis 186. In the example provided, the pinion gear 214 is a hypoid gear and the input axis 222 is perpendicular to and offset from the output axis 186, though other configurations can be used.

The differential assembly 120 can be any suitable type of differential configured to receive input torque from the input pinion 118 and output differential output torque to the first and second output members 122, 124. In the example provided, the differential assembly 120 includes an open differential that includes a differential case 226, a ring gear 230, a cross-pin assembly 234, a first side gear 238, a second side gear 242, a first differential pinion 246, a second differential pinion 250, a third differential pinion 254, and a fourth differential pinion 258. The differential case 226 can be supported within the inner cavity 146 of the main body 134 for rotation relative to the main body 134, such as by the differential bearings 130. The ring gear 230 can be fixedly coupled to the differential case 226 for common rotation about the output axis 186, such as by welding or fasteners (not specifically shown) for example.

The cross-pin assembly 234 can be mounted to the differential case 226 for common rotation about the output axis 186 with the differential case 226. The cross-pin assembly 234 is described in greater detail below, but can generally have a first longitudinal portion 262 and a second longitudinal portion 266. The first longitudinal portion 262 can extend through the interior of the differential case 226 such that the longitudinal axis of the first longitudinal portion 262 is perpendicular to the output axis 186. The second longitudinal portion 266 can extend through the interior of the differential case 226 and intersect the first longitudinal portion 262, such that the longitudinal axis of the second longitudinal portion 266 is perpendicular to the output axis 186 and the longitudinal axis of the first longitudinal portion 262. In other words, the first and second longitudinal portions 262, 266 can be perpendicular to each other and the output axis 186 to form a cross-shape, or a plus-shape (e.g., "+").

The differential pinions 246, 250, 254, 258 can be located within the differential case 226. The first and second differential pinions 246, 250 can be disposed about opposite axial sides of the first longitudinal portion 262, such that the first and second differential pinions 246, 250 are rotatably mounted to the first longitudinal portion 262 within the differential case 226 for common rotation about the output axis 186 with the differential case 226, while being rotatable relative to the differential case 226 about the longitudinal axis of the first longitudinal portion 262. In the example provided, the first and second differential pinions 246, 250 are rotatable relative to their respective opposite axial sides of the first longitudinal portion 262, such that the first and second differential pinions 246, 250 can rotate independently of one another about the longitudinal axis of the first longitudinal portion 262.

The third and fourth differential pinions 254, 258 can be disposed about opposite axial sides of the second longitudinal portion 266, such that the third and fourth differential pinions 254, 258 are rotatably mounted to the second longitudinal portion 266 within the differential case 226 for common rotation about the output axis 186 with the differential case 226, while being rotatable relative to the differential case 226 and the first and second differential pinions 246, 250 about the longitudinal axis of the second longitudinal portion 266. In the example provided, the third and fourth differential pinions 254, 258 are rotatable relative to their respective opposite axial sides of the second longitudinal portion 266, such that the third and fourth differential pinions 254, 258 can rotate independently of one another about the longitudinal axis of the second longitudinal portion 266.

The first and second side gears 238, 242 can be disposed about the output axis 186 and mounted within the differential case 226, on opposite axial sides of the differential case 226, for rotation relative to the differential case 226 about the output axis 186. The first side gear 238 can be meshingly engaged with the differential pinions 246, 250, 254, 258. The second side gear 242 can be meshingly engaged with the differential pinions 246, 250, 254, 258. The inboard end of the first output member 122 can be non-rotatably coupled to the first side gear 238 for common rotation about the output axis 186, such as via mating splines for example. The inboard end of the second output member 124 can be non-rotatably coupled to the second side gear 242 for common rotation about the output axis 186, such as via mating splines for example.

Figures 3, 4:
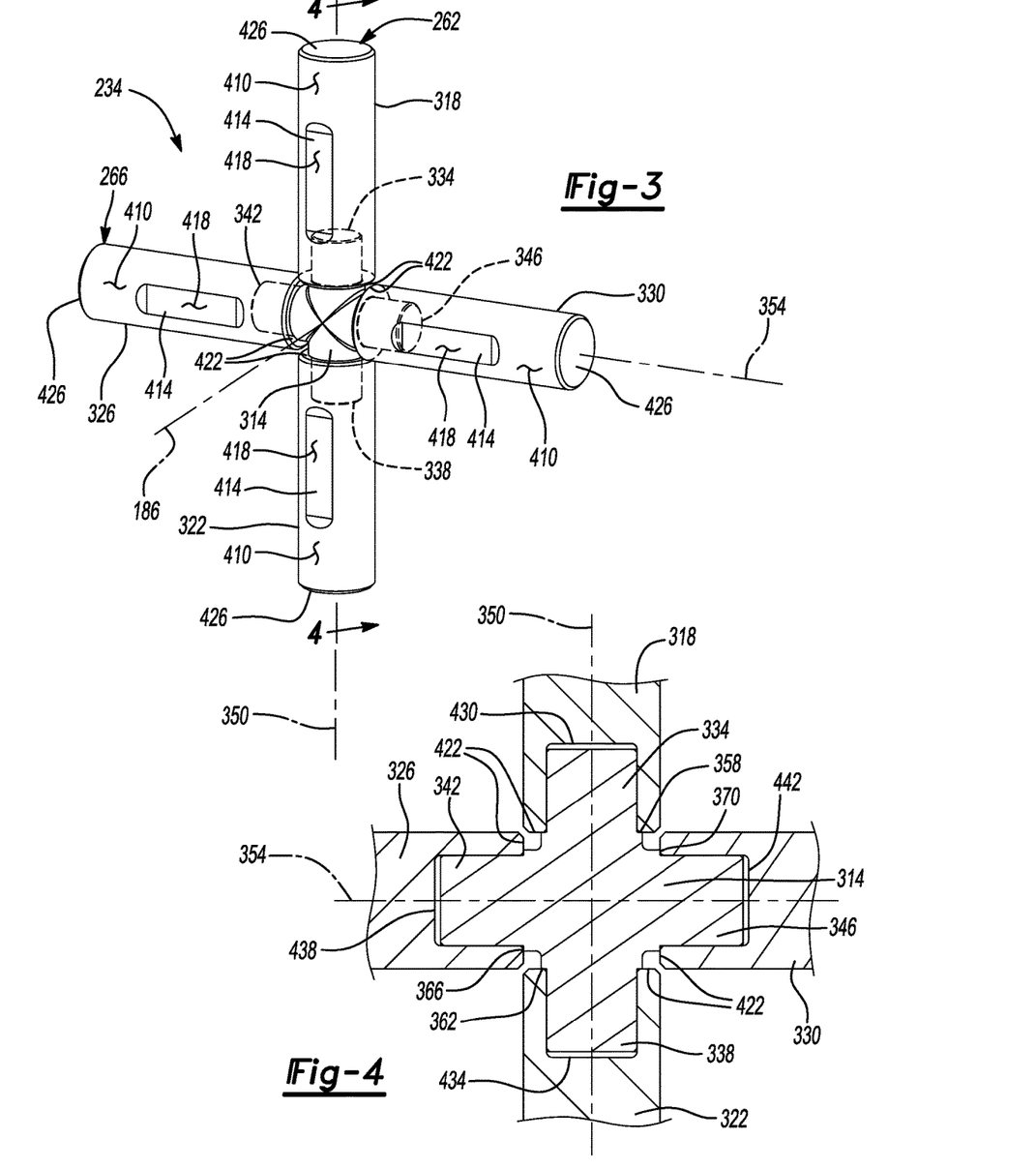
FIG. 3 is a perspective view of a cross-pin of a first construction of the differential of FIG. 2.
FIG. 4 is a sectional view of a portion of the cross-pin of FIG. 3.

With additional reference to FIGS. 3 and 4, the cross-pin assembly 234 can include a center spider 314, a first pin 318, a second pin 322, a third pin 326, and a fourth pin 330. The center spider 314 can include a first cylindrical post 334, a second cylindrical post 338, a third cylindrical post 342, and a fourth cylindrical post 346. The first post 334 and the second post 338 can be disposed coaxially about a first pinion axis 350. The third post 342 and the fourth post 346 can be disposed coaxially about a second pinion axis 354 that can be perpendicular to the first pinion axis 350.

The first, second, third, and fourth posts 334, 338, 342, 346 can each have a proximal portion and a distal portion. The first post 334, the second post 338, the third post 342, and the fourth post 346 can be fixedly coupled to each other at their respective proximal portions, which can be at an intersection of the first and second pinion axes 350, 354. As such, each of the first and second posts 334, 338 can extend along the first pinion axis 350 in opposite directions away from the second pinion axis 354 toward its respective distal portion, while each of the third and fourth posts 342, 346 extend along the second pinion axis 354 in opposite directions away from the first pinion axis 350 toward its respective distal portion to form a cross-shape, or plus-shape ("+").

Together, the first pin 318, the second pin 322, the first post 334, and the second post 338 can define the first longitudinal portion 262 (FIG. 2), and the first pinion axis 350 can be the longitudinal axis of the first longitudinal portion 262 (FIG. 2). Together, the third pin 326, the fourth pin 330, the third post 342, and the fourth post 346 can define the second longitudinal portion 266 (FIG. 2), and the second pinion axis 354 can be the longitudinal axis of the second longitudinal portion 266 (FIG. 2). In the example provided, the first, second, third, and fourth posts 334, 338, 342, 346 are similarly constructed such that the center spider 314 is symmetrical across the first pinion axis 350 and also across the second pinion axis 354.

In the example provided, the proximal and distal portions of the first post 334 are both cylindrical in shape and the proximal portion of the first post 334 can have an outermost diameter that is greater than an outermost diameter of the distal portion of the first post 334. The first post 334 can define a step 358 where the outermost diameter of the first post 334 steps down from the diameter of the proximal portion to the diameter of the distal portion.

In the example provided, the proximal and distal portions of the second post 338 are both cylindrical in shape and the proximal portion of the second post 338 can have an outermost diameter that is greater than an outermost diameter of the distal portion of the second post 338. The second post 338 can define a step 362 where the outermost diameter of the second post 338 steps down from the diameter of the proximal portion to the diameter of the distal portion.

In the example provided, the proximal and distal portions of the third post 342 are both cylindrical in shape and the proximal portion of the third post 342 can have an outermost diameter that is greater than an outermost diameter of the distal portion of the third post 342. The third post 342 can define a step 366 where the outermost diameter of the third post 342 steps down from the diameter of the proximal portion to the diameter of the distal portion.

In the example provided, the proximal and distal portions of the fourth post 346 are both cylindrical in shape and the proximal portion of the fourth post 346 can have an outermost diameter that is greater than an outermost diameter of the distal portion of the fourth post 346. The fourth post 346 can define a step 370 where the outermost diameter of the fourth post 346 steps down from the diameter of the proximal portion to the diameter of the distal portion.

In an alternative construction, the proximal portions of the first, second, third, and fourth posts 334, 338, 342, 346 can be a shape other than cylindrical, while having an outermost radial width relative to the corresponding axis (e.g., the first or second pinion axis 350, 354) that is greater than that of the corresponding distal portion.

In the example provided, the first, second, third, and fourth pins 318, 322, 326, 330 are similarly constructed such that the cross-pin assembly 234 is symmetrical across the first pinion axis 350 and also across the second pinion axis 354. Each of the first, second, third, and fourth pins 318, 322, 326, 330 can have a generally cylindrical shaped outermost surface 410.

In the example provided, each of the first, second, third, and fourth pins 318, 322, 326, 330 includes a lubrication channel 414 that can be recessed radially inward from the corresponding outermost surface 410. In the example provided, the lubrication channel 414 can have a flat surface 418 recessed radially inward from the outermost surface 410. With reference to the first and second pins 318, 322, the flat surface 418 can be recessed such that a perpendicular distance from the first pinion axis 350 to the flat surface 418 is less than a radial distance from the first pinion axis 350 to the corresponding outermost surface 410. With reference to the third and fourth pins 326, 330, the flat surface 418 can be recessed such that a perpendicular distance from the second pinion axis 354 to the flat surface 418 is less than a radial distance from the second pinion axis 354 to the corresponding outermost surface 410. The flat surface 418 can extend longitudinally along each pin 318, 322, 326, 330. A total longitudinal length of the corresponding pin 318, 322, 326, 330 can be greater than a longitudinal length of the lubrication channel 414 and opposite longitudinal ends of the lubrication channel 414 can be axially spaced apart from opposite longitudinal ends of the corresponding pin 318, 322, 326, 330 (i.e., a proximal end 422 and a distal end 426 of each pin 318, 322, 326, 330).

The proximal end 422 of the first pin 318 can define a first bore 430 that is open at the proximal end 422. The distal end 426 of the first pin 318 can be closed such that the first bore 430 terminates within the first pin 318. An axial distance from the proximal end 422 to the termination of the first bore 430 can be less than an axial distance from the distal end 426 to the termination of the first bore 430. The first bore 430 can have a diameter that is similar to the outermost diameter of the distal portion of the first post 334, such that the distal portion of the first post 334 can be received within the first bore 430. In the example provided, the distal portion of the first post 334 can be a slip fit within the first bore 430. The distal portion of the first post 334 can be coaxial with the first bore 430 and can be axially slidably received within the first bore 430, such that the first pin 318 can be axially slidable relative to the center spider 314 along a longitudinal axis of the first pin 318 (e.g., the first axis 350). In the example provided, the distal portion of the first post 334 can be rotatably relative in the first bore 430. The first bore 430 can have a diameter that is less than the outermost diameter of the proximal portion of the first post 334 such that the proximal end 422 of the first pin 318 can abut the step 358.

The proximal end 422 of the second pin 322 can define a second bore 434 that is open at the proximal end 422. The distal end 426 of the second pin 322 can be closed such that the second bore 434 terminates within the second pin 322. An axial distance from the proximal end 422 to the termination of the second bore 434 can be less than an axial distance from the distal end 426 to the termination of the second bore 434. The second bore 434 can have a diameter that is similar to the outermost diameter of the distal portion of the second post 338, such that the distal portion of the second post 338 can be received within the second bore 434. In the example provided, the distal portion of the second post 338 can be a slip fit within the second bore 434. The distal portion of the second post 338 can be coaxial with the second bore 434 and can be axially slidably received within the second bore 434, such that the second pin 322 can be axially slidable relative to the center spider 314 along a longitudinal axis of the second pin 322 (e.g., the first axis 350). In the example provided, the distal portion of the second post 338 can be rotatably received in the second bore 434. The second bore 434 can have a diameter that is less than the outermost diameter of the proximal portion of the second post 338 such that the proximal end 422 of the second pin 322 can abut the step 362.

The proximal end 422 of the third pin 326 can define a third bore 438 that is open at the proximal end 422. The distal end 426 of the third pin 326 can be closed such that the third bore 438 terminates within the third pin 326. An axial distance from the proximal end 422 to the termination of the third bore 438 can be less than an axial distance from the distal end 426 to the termination of the third bore 438. The third bore 438 can have a diameter that is similar to the outermost diameter of the distal portion of the third post 342, such that the distal portion of the third post 342 can be received within the third bore 438. In the example provided, the distal portion of the third post 342 can be a slip fit within the third bore 438. The distal portion of the third post 342 can be coaxial with the third bore 438 and can be axially slidably received within the third bore 438, such that the third pin 326 can be axially slidable relative to the center spider 314 along a longitudinal axis of the third pin 326 (e.g., the second axis 354). In the example provided, the distal portion of the third post 342 can be rotatably received in the third bore 438. The third bore 438 can have a diameter that is less than the outermost diameter of the proximal portion of the third post 342 such that the proximal end 422 of the third pin 326 can abut the step 366.

The proximal end 422 of the fourth pin 330 can define a fourth bore 442 that is open at the proximal end 422. The distal end 426 of the fourth pin 330 can be closed such that the fourth bore 442 terminates within the fourth pin 330. An axial distance from the proximal end 422 to the termination of the fourth bore 442 can be less than an axial distance from the distal end 426 to the termination of the fourth bore 442. The fourth bore 442 can have a diameter that is similar to the outermost diameter of the distal portion of the fourth post 346, such that the distal portion of the fourth post 346 can be received within the fourth bore 442. In the example provided, the distal portion of the fourth post 346 can be a slip fit within the fourth bore 442. The distal portion of the fourth post 346 can be coaxial with the fourth bore 442 and can be axially slidably received within the fourth bore 442, such that the fourth pin 330 can be axially slidable relative to the center spider 314 along a longitudinal axis of the fourth pin 330 (e.g., the second axis 354). In the example provided, the distal portion of the fourth post 346 can be rotatably received in the fourth bore 442. The fourth bore 442 can have a diameter that is less than the outermost diameter of the proximal portion of the fourth post 346 such that the proximal end 422 of the fourth pin 330 can abut the step 370.

In the example provided, the first, second, third, and fourth pins 318, 322, 326, 330 do not touch each other. The first differential pinion 246 (FIG. 2) can be disposed coaxially about the first pin 318 such that the first differential pinion 246 (FIG. 2) is rotatably supported by the first pin 318 within the differential case 226 (FIG. 2). The second differential pinion 250 (FIG. 2) can be disposed coaxially about the second pin 322 such that the second differential pinion 250 (FIG. 2) is rotatably supported by the second pin 322 within the differential case 226 (FIG. 2). The third differential pinion 254 (FIG. 2) can be disposed coaxially about the third pin 326 such that the third differential pinion 254 (FIG. 2) is rotatably supported by the third pin 326 within the differential case 226 (FIG. 2). The fourth differential pinion 258 (FIG. 2) can be disposed coaxially about the fourth pin 330 such that the fourth differential pinion 258 (FIG. 2) is rotatably supported by the fourth pin 330 within the differential case 226 (FIG. 2).

Figures 5, 6:
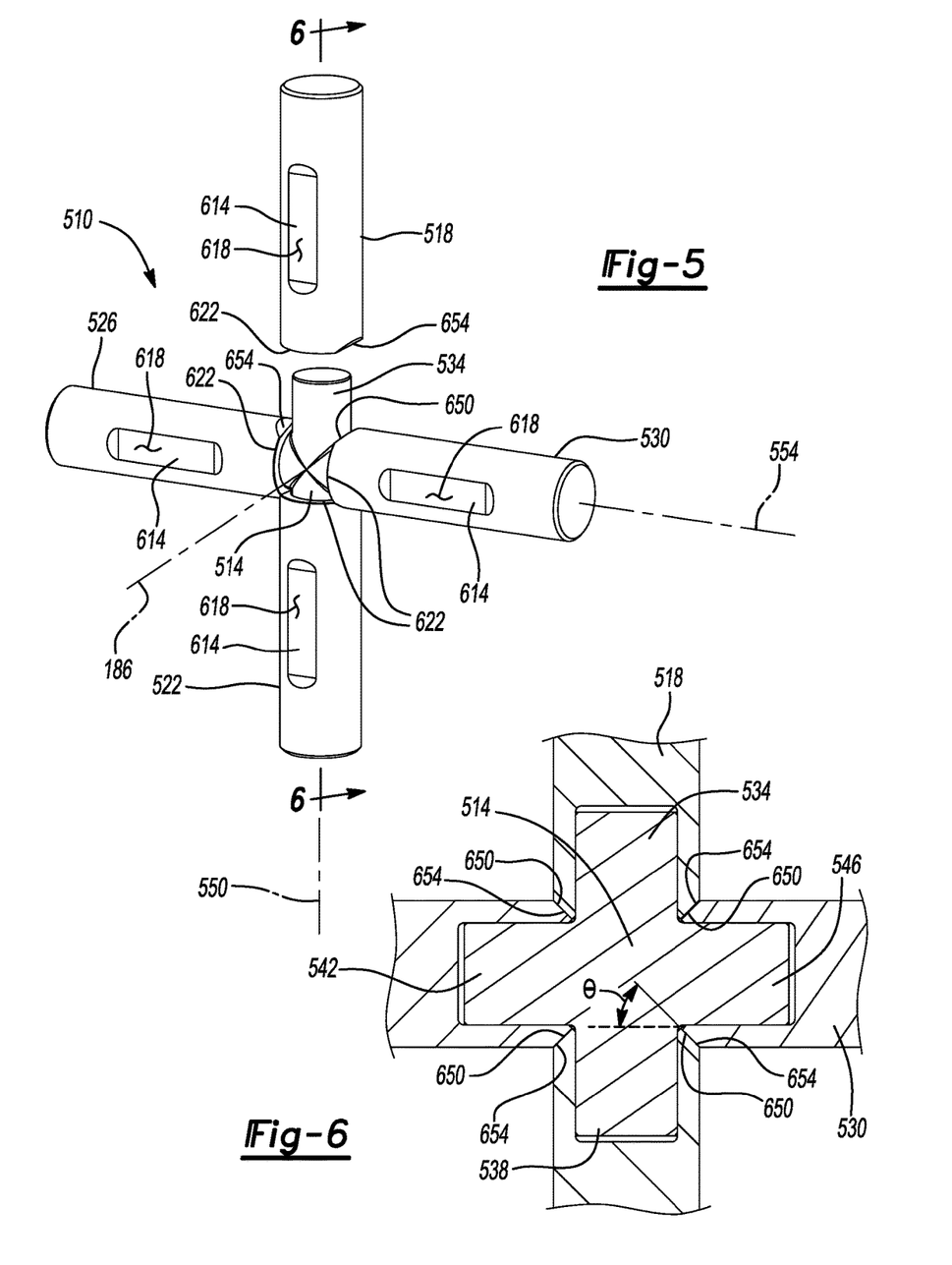
FIG. 5 is a partially exploded perspective view of a cross-pin of a second construction in accordance with the present teachings.
FIG. 6 is a sectional view of a portion of the cross-pin of FIG. 5.

With additional reference to FIGS. 5 and 6, a cross-pin assembly 510 can include a center spider 514, a first pin 518, a second pin 522, a third pin 526, and a fourth pin 530. The cross-pin assembly 510 can be similar to the cross-pin assembly 234 (FIGS. 2-4), except as otherwise shown or described herein. The center spider 514 can include a first cylindrical post 534, a second cylindrical post 538, a third cylindrical post 542, and a fourth cylindrical post 546. The first post 534 and the second post 538 can be disposed coaxially about a first pinion axis 550. The third post 542 and the fourth post 546 can be disposed coaxially about a second pinion axis 554 that can be perpendicular to the first pinion axis 550.

In the example provided, the first, second, third, and fourth posts 534, 538, 542, 546 can be similar to the first, second, third, and fourth posts 334, 338, 342, 346 (FIGS. 3 and 4), except that the proximal portion of each first, second, third, and fourth post 534, 538, 542, 546 can be the same diameter as the corresponding distal portion, such that the center spider 514 can be without the steps 358, 362, 366, 370 (FIG. 4).

The first, second, third, and fourth pins 518, 522, 526, 530 can be similar to the first, second, third, and fourth pins 318, 322, 326, 330 (FIGS. 3 and 4), except that a proximal end 622 of each pin 518, 522, 526, 530 can be chamfered. The proximal ends 622 of the pins 518, 522, 526, 530 can otherwise be similar to the proximal ends 422 of the pins 318, 322, 326, 330 (FIGS. 3 and 4). In the example provided, each of the first, second, third, and fourth pins 518, 522, 526, 530 includes a pair of planar chamfered surfaces (i.e., a first chamfered surface 650 and a second chamfered surface 654). Each first chamfered surface 650 can be diametrically opposite to the corresponding second chamfered surface 654 of the same pin 518, 522, 526, 530. The first and second chamfered surfaces 650, 654 can be at an angle θ relative to the corresponding proximal end 622 of the pin 518, 522, 526, 530. In the example provided, the angle θ is 45°, though other configurations can be used.

In the example provided, each of the pins 518, 522, 526, 530 can include a lubrication channel 614 with a flat surface 618, that can be similar to the lubrication channel 414 (FIG. 3). The first and second chamfered surfaces 650, 654 can be on sides of the pin 518, 522, 526, 530 that do not include the lubrication channel 614. In the example provided, the first and second chamfered surfaces 650, 654 oppose and contact with adjacent ones of the first and second chamfered surfaces 650, 654 on adjacent ones of the pins 518, 522, 526, 530. In other words: the first chamfered surface 650 of the first pin 518 can oppose and contact the second chamfered surface 654 of the third pin 526; the second chamfered surface 654 of the first pin 518 can oppose and contact the first chamfered surface 650 of the fourth pin 530; the first chamfered surface 650 of the second pin 522 can oppose and contact the second chamfered surface 654 of the fourth pin 530; and the second chamfered surface 654 of the second pin 522 can oppose and contact the first chamfered surface 650 of the third pin 526.

In the example provided, when the pins 518, 522, 526, 530 are fully inserted on their respective posts 534, 538, 542, 546, contact between the first and second chamfered surfaces 650, 654 can inhibit or prevent the pins 518, 522, 526, 530 from rotating relative to the center spider 514. In the example provided, the lubrication channels 614 of each pin 518, 522, 526, 530 all face in the same direction, such that the flat surfaces 618 of the lubrication channels 614 are parallel and stay located 90° to the load direction.

Figure 7:
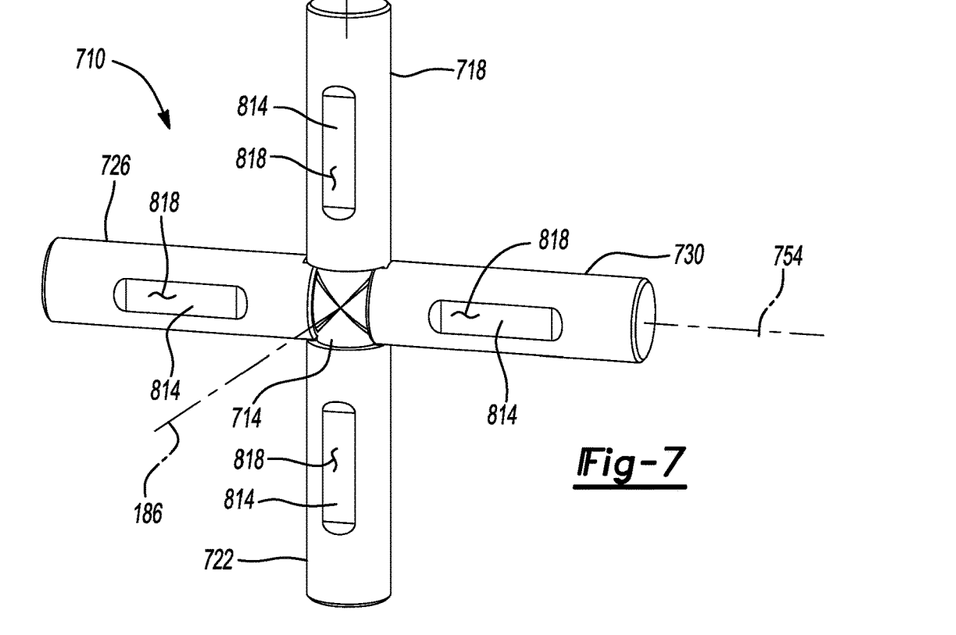
FIG. 7 is a perspective view of a cross-pin of a third construction in accordance with the present teachings.
Figure 8:
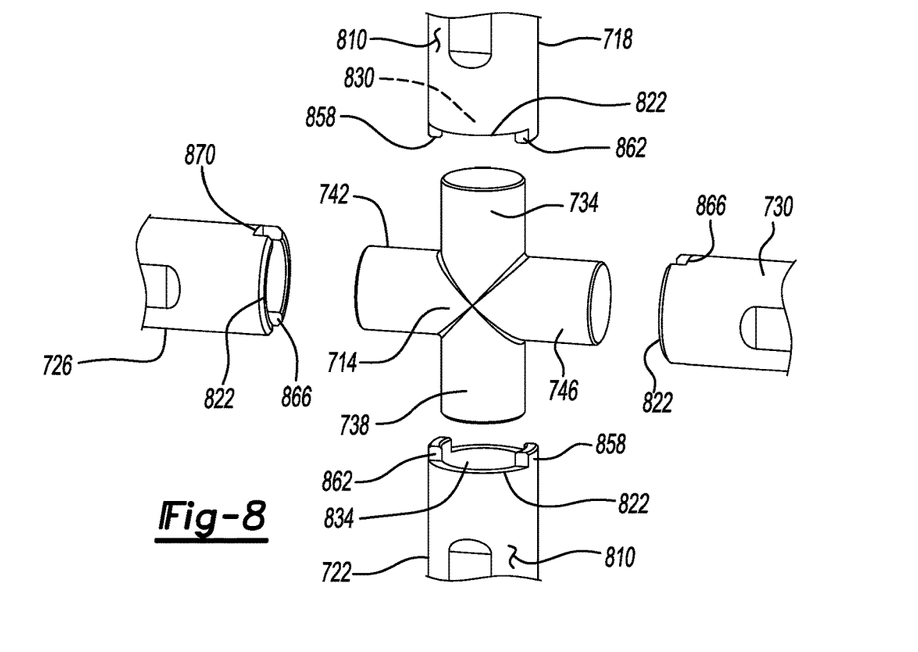
FIG. 8 is a sectional view of a portion of the cross-pin of FIG. 7.

With additional reference to FIGS. 7 and 8, a cross-pin assembly 710 can include a center spider 714, a first pin 718, a second pin 722, a third pin 726, and a fourth pin 730. The cross-pin assembly 710 can be similar to the cross-pin assembly 234 (FIGS. 2-4), except as otherwise shown or described herein. The center spider 714 can include a first cylindrical post 734, a second cylindrical post 738, a third cylindrical post 742, and a fourth cylindrical post 746. The first post 734 and the second post 738 can be disposed coaxially about a first pinion axis 750. The third post 742 and the fourth post 746 can be disposed coaxially about a second pinion axis 754 that can be perpendicular to the first pinion axis 750.

In the example provided, the first, second, third, and fourth posts 734, 748, 742, 746 can be similar to the first, second, third, and fourth posts 334, 338, 342, 346 (FIGS. 3 and 4), except that the proximal portion of each first, second, third, and fourth post 734, 748, 742, 746 can be the same diameter as the corresponding distal portion, such that the center spider 514 can be without the steps 358, 362, 366, 370 (FIG. 4).

The first and second pins 718, 722 can be similar to the first and second pins 318, 322 (FIGS. 3 and 4), except that the first and second pins 718, 722 can each have a first tang 858 and a second tang 862 that extend longitudinally from a proximal end 822 of the corresponding pin 718, 722 in a direction toward the second pinion axis 754. The proximal end 822 of each pin 718, 722 can otherwise be similar to the proximal end 422 of the pins 318, 322 (FIGS. 3 and 4).

In the example provided, the tangs 858, 862 are arcuate in shape, such that a radially outermost surface of each tang 858, 862 is flush with an outermost surface 810 of the corresponding pin 718, 722, while the radially innermost surface of each tang 858, 862 is flush with a corresponding first or second bore 830, 834. The outermost surface 810, first bore 830, and second bore 834 can be otherwise similar to the outermost surface 410, the first bore 430, and the second bore 434 (FIGS. 3 and 4). The tangs 858, 862 can be such that they are diametrically opposite of one another and do not extend completely circumferentially about the first pinion axis 750.

The third and fourth pins 726, 730 can be similar to the third and fourth pins 326, 330 (FIGS. 3 and 4), except that the proximal ends 822 of the third and fourth pins 726, 730 can each define a first groove 866 and a second groove 870. The first and second grooves 866, 870 can be recessed from the proximal ends 822 longitudinally in a direction away from the first pinion axis 750. The first and second grooves 866, 870 can be diametrically opposite one another. The proximal end 822 of each pin 726, 730 can otherwise be similar to the proximal end 422 of the pins 326, 330 (FIGS. 3 and 4).

The first groove 866 of each pin 726, 730 can matingly receive the second tang 862 of an adjacent one of the pins 718, 722, while the second groove 870 of each pin 726, 730 can matingly receive the first tang 858 of an adjacent one of the pins 718, 722. In other words: the first tang 858 of the first pin 718 can slide axially into the second groove 870 of the third pin 726; the second tang 862 of the first pin 718 can slide axially into the first groove 866 of the fourth pin 730; the first tang 858 of the second pin 722 can slide axially into the second groove 870 of the fourth pin 730; and the second tang 862 of the second pin 722 can slide axially into the first groove 866 of the third pin 726.

In the example provided, when the pins 718, 722, 726, 730 are fully inserted on their respective posts 734, 738, 742, 746, contact between the first and second tangs 858, 862 and the first and second grooves 866, 870 can inhibit or prevent the pins 718, 722, 726, 730 from rotating relative to the center spider 714. In the example provided, each of the first, second, third, and fourth pins 718, 722, 726, 730 also includes a lubrication channel 814, similar to the lubrication channel 414 (FIG. 3). The first and second tangs 858, 862 and the first and second grooves 866, 870 can be on sides of the corresponding pin 718, 722, 726, 730 that do not include the lubrication channel 814. In the example provided, the lubrication channels 814 of each pin 718, 722, 726, 730 all face in the same direction, such that the flat surfaces 818 of the lubrication channels 814 are parallel and stay located 90°.

In an alternative construction, the pins 718, 722, 726, 730 can have mating splines that engage each other when the pins 718, 722, 726, 730 are fully inserted on their respective posts 734, 738, 742, 746 to inhibit or prevent the pins 718, 722, 726, 730 from rotating relative to the center spider 714.

Figure 9:
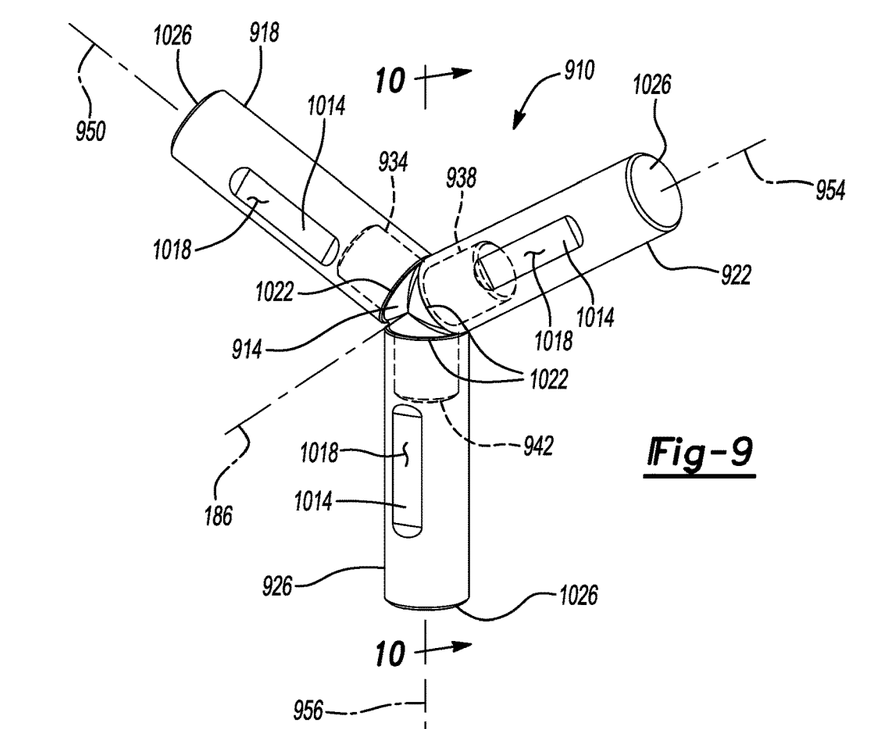
FIG. 9 is a perspective view of a cross-pin of a fourth construction in accordance with the present teachings.
Figure 10:
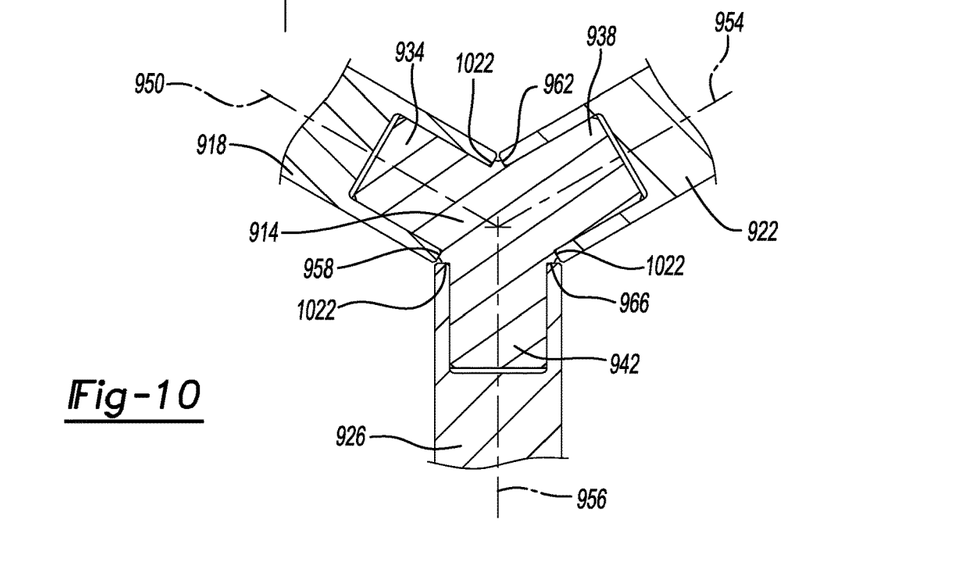
FIG. 10 is a sectional view of a portion of the cross-pin of FIG. 9.

With additional reference to FIGS. 9 and 10, a cross-pin assembly 910 can include a center spider 914, a first pin 918, a second pin 922, and a third pin 926. The cross-pin assembly 910 can be similar to the cross-pin assemblies 234, 510, or 710 (FIGS. 2-8), except as otherwise shown or described herein. The center spider 914 can include a first cylindrical post 934, a second cylindrical post 938, and a third cylindrical post 942. In the example provided, the center spider 914 does not include a fourth cylindrical post and only includes three posts 934, 938, 942. The first post 934 can extend longitudinally along a first pinion axis 950. The second post 938 can extend longitudinally along a second pinion axis 954. The third post 942 can extend longitudinally along a third pinion axis 956. The first, second, and third pinion axes 950, 954, 956 can be coplanar and can intersect at a center of the center spider 914.

The first, second, and third posts 934, 938, 942 can each have a proximal portion and a distal portion. The first post 934, the second post 938, and the third post 942 can be fixedly coupled to each other at their respective proximal portions, which can be at the intersection of the first, second, and third pinion axes 950, 954, 956. The first, second, and third pinion axes 950, 954, 956 can extend outward from the center of the center spider 914 at 60° angles relative to each other such that each post 934, 938, 942 is equally angularly spaced about the output axis 186. Each of the first, second, and third posts 934, 938, 942 can extend along its corresponding first, second, or third pinion axis 950, 954, 956 away from the intersection of the pinion axes 950, 954, 956 toward its corresponding distal portion to form an equi-angled Y-shape, (e.g., a three-pronged star shape).

In the example provided, the proximal and distal portions of the first post 934 are both cylindrical in shape and the proximal portion of the first post 934 can have an outermost diameter that is greater than an outermost diameter of the distal portion of the first post 934. The first post 934 can define a step 958 where the outermost diameter of the first post 934 steps down from the diameter of the proximal portion to the diameter of the distal portion.

In the example provided, the proximal and distal portions of the second post 938 are both cylindrical in shape and the proximal portion of the second post 938 can have an outermost diameter that is greater than an outermost diameter of the distal portion of the second post 938. The second post 938 can define a step 962 where the outermost diameter of the second post 938 steps down from the diameter of the proximal portion to the diameter of the distal portion.

In the example provided, the proximal and distal portions of the third post 942 are both cylindrical in shape and the proximal portion of the third post 942 can have an outermost diameter that is greater than an outermost diameter of the distal portion of the third post 942. The third post 942 can define a step 966 where the outermost diameter of the third post 942 steps down from the diameter of the proximal portion to the diameter of the distal portion.

In the example provided, the first, second, and third pins 918, 922, 926 can be similarly constructed such that the cross-pin assembly 910 is generally symmetrical across any one of the pinion axes 950, 954, 956. The first, second, and third pins 918, 922, 926 can have proximal 1022 and distal ends 1026 and can be similar to the first, second, and third pins 318, 322, 326, 518, 522, 526, or 718, 722, 726 (FIGS. 3-8). In the example provided, the first, second, and third pins 918, 922, 926 are constructed similar to the first, second, and third pins 318, 322, 326 (FIGS. 3 and 4). In the example provided, each of the pins 918, 922, 926 includes a lubrication channel 1014 with a flat surface 1018 that can be similar to the lubrication channel 414 and flat surface 418 (FIG. 3).

In an alternative construction, not specifically shown, the first, second, and third pins 918, 922, 926 can be constructed similar to the first, second, and third pins 518, 522, 526 (FIGS. 5 and 6), such that the proximal ends 1022 of each of the first, second, and third pins 918, 922, 926 can include chamfers. The chamfers can be similar to the first and second chamfers 650, 654 (FIGS. 5 and 6), except that the first chamfer of the first pin 918 can contact the second chamfer of the third pin 926, the second chamfer of the first pin 918 can contact the first chamfer of the second pin 922, and the second chamfer of the second pin 922 can contact the first chamfer of the third pin 926. The contact between the first and second chamfers can inhibit or prevent rotation of the pins 918, 922, 926 relative to the center spider 914. Thus, the lubrication channels 1014 of each pin 918, 922, 926 can all face in the same direction, such that the flat surfaces 1018 of the lubrication channels 1014 are parallel and stay located 90° to the load direction. The chamfers can be at an angle of 30° relative to the proximal end 1022 of the corresponding pin 918, 922, 926.

In another alternative construction, not specifically shown, the pins 918, 922, 926 can have mating splines similar to the tangs 858, 862 and grooves 866, 870 or mating splines, described above with reference to FIGS. 7 and 8, that engage each other when the pins 918, 922, 926 are fully inserted on their respective posts 934, 938, 942 to inhibit or prevent the pins 918, 922, 926 from rotating relative to the center spider 914. Thus the lubrication channels 1014 of each pin 918, 922, 926, 930 all face in the same direction, such that the flat surfaces 1018 of the lubrication channels 1014 are parallel and stay located 90° to the load direction.

When the cross-pin assembly 910 is used in an axle assembly similar to axle assembly 22 (FIG. 2), the differential assembly 120 only includes three pinion gears (e.g., the first, second, and third differential pinions 246, 250, 254) and does not include a fourth pinion gear (e.g., the fourth differential pinion 258). The first differential pinion 246 can be rotatably mounted on the first pin 918 for rotation about the first pinion axis 950, while rotating with the cross-pin assembly 910 about the output axis 186. The second differential pinion 250 can be rotatably mounted on the second pin 922 for rotation about the second pinion axis 954, while rotating with the cross-pin assembly 910 about the output axis 186. The third differential pinion 254 can be rotatably mounted on the third pin 926 for rotation about the third pinion axis 956, while rotating with the cross-pin assembly 910 about the output axis 186. The first, second and third differential pinions 246, 250, 254 can be meshingly engaged with the first and second side gears 238, 242 as otherwise described above with reference to FIG. 2.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A differential assembly comprising:
   a case adapted to be supported for rotation about an output axis, the case defining a cavity;
   a first side gear and a second side gear, the first and second side gears being disposed within the cavity and rotatable about the output axis relative to the case;
   a first pinion gear, a second pinion gear, and a third pinion gear, the first, second, and third pinion gears being disposed within the cavity and meshingly engaged with the first and second side gears; and
   a cross-pin assembly disposed within the cavity and coupled to the case for common rotation about the output axis with the case, the cross-pin assembly including:
   a center spider;
   a first pin disposed about a first axis and coupled to the center spider for axial translation relative to the center spider, the first pinion gear being supported by the first pin for rotation relative to the case about the first axis;
   a second pin disposed about a second axis and coupled to the center spider for axial translation relative to the center spider, the second pinion gear being supported by the second pin for rotation relative to the case about the second axis; and
   a third pin disposed about a third axis and coupled to the center spider for axial translation relative to the center spider, the third pinion gear being supported by the third pin for rotation relative to the case about the third axis;
   wherein a proximal end of the first pin includes a first chamfered surface and a proximal end of the second pin includes a second chamfered surface, the first chamfered surface contacting the second chamfered surface to inhibit rotation of the first pin relative to the second pin.

2. The differential assembly of claim 1, further comprising:
   a fourth pinion gear disposed within the cavity and meshingly engaged with the first and second side gears;
   wherein the cross-pin assembly further includes a fourth pin disposed about a fourth axis and coupled to the center spider for axial translation relative to the center spider, the fourth pinion gear being supported by the fourth pin for rotation relative to the case about the fourth axis;
   wherein the first and second axes are coaxial and the third and fourth axes are coaxial.

3. The differential assembly of claim 1, wherein the first chamfered surface is a flat surface disposed at a 45° angle relative to the proximal end of the first pin, and the second chamfered surface is a flat surface disposed at a 45° angle relative to the proximal end of the second pin.

4. The differential assembly of claim 1, wherein the first chamfered surface is a flat surface disposed at a 30° angle relative to the proximal end of the first pin, and the second chamfered surface is a flat surface disposed at a 30° angle relative to the proximal end of the second pin.

5. The differential assembly of claim 1, wherein each of the first, second, and third pins includes an outermost cylindrical surface and a lubrication channel recessed from the outermost cylindrical surface.

6. A differential assembly comprising:
   a case adapted to be supported for rotation about an output axis, the case defining a cavity;
   a first side gear and a second side gear, the first and second side gears being disposed within the cavity and rotatable about the output axis relative to the case;
   a first pinion gear, a second pinion gear, and a third pinion gear, the first, second, and third pinion gears being disposed within the cavity and meshingly engaged with the first and second side gears; and
   a cross-pin assembly disposed within the cavity and coupled to the case for common rotation about the output axis with the case, the cross-pin assembly including:
   a center spider;
   a first pin disposed about a first axis and coupled to the center spider for axial translation relative to the center spider, the first pinion gear being supported by the first pin for rotation relative to the case about the first axis;
   a second pin disposed about a second axis and coupled to the center spider for axial translation relative to the center spider, the second pinion gear being supported by the second pin for rotation relative to the case about the second axis; and
   a third pin disposed about a third axis and coupled to the center spider for axial translation relative to the center spider, the third pinion gear being supported by the third pin for rotation relative to the case about the third axis, wherein the center spider includes a first post, a second post, and a third post, wherein the first pin defines a first bore, the second pin defines a second bore, and the third pin defines a third bore, the first post being slidably received within the first bore, the second post being slidably received within the second bore, and the third post being slidably received within the third bore.

7. The differential assembly of claim 6, wherein each of the first, second, and third posts includes a proximal portion and a distal portion, each proximal portion having an outermost radial width that is greater than an outermost radial width of the distal portion to define a step, wherein each step contacts a corresponding one of the first, second, or third pins to prevent axial translation of the corresponding first, second, or third pin toward a center of the center spider.

8. The differential assembly of claim 7, wherein the steps space the first, second, and third pins axially apart to prevent contact between the first, second, and third pins.

9. A differential assembly comprising:
a case adapted to be supported for rotation about an output axis, the case defining a cavity;
a first side gear and a second side gear, the first and second side gears being disposed within the cavity and rotatable about the output axis relative to the case;
a first pinion gear, a second pinion gear, and a third pinion gear, the first, second, and third pinion gears being disposed within the cavity and meshingly engaged with the first and second side gears; and
a cross-pin assembly disposed within the cavity and coupled to the case for common rotation about the output axis with the case, the cross-pin assembly including:
a center spider including a first post;
a first pin disposed about a first axis, the first pin having a proximal end and a distal end and extending longitudinally therebetween, the proximal end of the first pin defining a first bore, the first post being received in the first bore to couple the first pin to the center spider, the first pinion gear being supported by the first pin for rotation relative to the case about the first axis;
a second pin disposed about a second axis, the second pin having a proximal end and a distal end and extending longitudinally therebetween, the proximal end of the second pin being coupled to the center spider, the second pinion gear being supported by the second pin for rotation relative to the case about the second axis; and
a third pin disposed about a third axis, the third pin having a proximal end and a distal end and extending longitudinally therebetween, the proximal end of the third pin being coupled to the center spider, the third pinion gear being supported by the third pin for rotation relative to the case about the third axis.

10. The differential assembly of claim 9, wherein the center spider includes a second post, wherein the proximal end of the second pin defines a second bore, the second post being received in the second bore to couple the second pin to the second spider.

11. The differential assembly of claim 10, wherein the first and second axes are coaxial.

12. The differential assembly of claim 10, wherein the second axis is transverse to the first axis.

13. The differential assembly of claim 9, wherein the proximal end of the first pin includes a first chamfered surface and the proximal end of the second pin includes a second chamfered surface, the first chamfered surface contacting the second chamfered surface to inhibit rotation of the first pin relative to the second pin.

14. The differential assembly of claim 13, wherein each of the first, second, and third pins includes an outermost cylindrical surface and a lubrication channel recessed from the outermost cylindrical surface.

15. The differential assembly of claim 14, wherein each of the lubrication channels includes a flat surface that is parallel to the first, second, and third axes.

16. The differential assembly of claim 9, wherein the first pin includes a tang that extends axially from the proximal end of the first pin, and the second pin includes a groove that is recessed axially from the proximal end of the second pin, the tang being received in the groove to inhibit rotation of the first pin relative to the second pin.

17. The differential assembly of claim 16, wherein each of the first, second, and third pins includes an outermost cylindrical surface and a lubrication channel recessed from the outermost cylindrical surface.

18. The differential assembly of claim 17, wherein each of the lubrication channels includes a flat surface that is parallel to the first, second, and third axes.

* * * * *